United States Patent [19] … Genise

[11] Patent Number: 5,620,392
[45] Date of Patent: Apr. 15, 1997

[54] ENGINE ACCESSORY TORQUE AND ENGINE DECELERATION RATE LINEAR RELATIONSHIP AND ENGINE ROTATIONAL MOMENT-OF-INERTIA DETERMINATION METHOD/SYSTEM

[75] Inventor: Thomas A. Genise, Dearborn, Mich.

[73] Assignee: Eaton Corporation, Cleveland, Ohio

[21] Appl. No.: 309,713

[22] Filed: Sep. 21, 1994

Related U.S. Application Data

[63] Continuation-in-part of Ser. No. 242,824, May 16, 1994.

[51] Int. Cl.$^6$ .............. B60K 41/00; F16H 59/14
[52] U.S. Cl. ............................. 477/120; 477/904
[58] Field of Search ............... 477/78, 120, 904; 73/116; 364/424.1

[56] References Cited

U.S. PATENT DOCUMENTS

| | | | |
|---|---|---|---|
| 3,942,365 | 3/1976 | Hanson et al. | 73/116 |
| 4,361,060 | 11/1982 | Smyth | 74/866 |
| 4,595,986 | 7/1986 | Daubenspeck et al. | 364/424.1 |
| 4,621,524 | 11/1986 | von Thun | 73/116 |
| 4,648,290 | 3/1987 | Dunkley et al. | 74/866 |
| 5,053,959 | 10/1991 | Genise | 74/866 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,133,229 | 7/1992 | Asada et al. | 364/424.1 |
| 5,172,609 | 12/1992 | Nitz et al. | 74/866 |
| 5,226,323 | 7/1993 | Wakayam | 73/116 X |
| 5,231,582 | 7/1993 | Takahashi et al. | 364/424.1 |
| 5,231,897 | 8/1993 | Morita | 74/866 |
| 5,241,476 | 8/1993 | Benford et al. | 364/424.1 |
| 5,272,939 | 12/1993 | Markyvech et al. | 74/866 |
| 5,425,689 | 6/1995 | Genise | 477/120 |

FOREIGN PATENT DOCUMENTS

| | | | |
|---|---|---|---|
| 3122362 | 1/1983 | Germany | 73/116 |
| 120748 | 7/1984 | Japan | 73/116 |

*Primary Examiner*—Khoi Q. Ta
*Attorney, Agent, or Firm*—Howard D. Gordon

[57] ABSTRACT

A method/system for controlling an automated transmission is provided wherein upon assembly of a vehicle, the intercept (A) and slope (B) values defining the presumed linear relationship between engine deceleration rate and engine accessory torque (dES/dt rate=A+(B * $T_{ACCES}$)) and/or the value of engine rotational moment-of-inertia (I) for that particular vehicle are determined and memorized. Thereafter, the transmission is controlled as a function of these determined values.

5 Claims, 7 Drawing Sheets

ENGINE ACCESSORY TORQUE AND ENGINE DECELERATION RATE LINEAR RELATIONSHIP AND ENGINE ROTATIONAL MOMENT-OF-INERTIA DETERMINATION METHOD/SYSTEM

BACKGROUND OF THE INVENTION

Related Application

This application is a continuation-in-part of U.S. Ser. No. 08/242,824, entitled ENGINE ACCESSORY TORQUE AND ENGINE DECELERATION RATE DETERMINATION METHOD/SYSTEM, filed May 16, 1994, and assigned to the same assignee, EATON CORPORATION, as is this application.

This application is related To U.S. Ser. No. 08/179,060, entitled ENGINE BRAKE ENHANCED UPSHIFT CONTROL METHOD/SYSTEM, filed Jan. 7, 1994, and assigned to the same assignee, EATON CORPORATION, as is this application.

This application is related to U.S. Ser. No. 08/192,522, entitled METHOD/SYSTEM TO DETERMINE GROSS COMBINATION WEIGHT OF VEHICLES, filed Feb. 7, 1994, and assigned to the same assignee, EATON CORPORATION, as is this application.

This application is related to U.S. Ser. No. 08/226,749, entitled ADAPTIVE SHIFT CONTROL METHOD/SYSTEM, filed Apr. 12, 1994, and assigned to the same assignee, EATON CORPORATION, as is this application.

This application is related to U.S. Ser. No. 08/225,271, entitled ENGINE DECELERATION DETERMINATION METHOD/SYSTEM, filed Apr. 5, 1994, and assigned to the same assignee, EATON CORPORATION, as is this application.

This application is related to U.S. Ser. No. 08/242,825, entitled ENGINE FLYWHEEL TORQUE DETERMINATION METHOD/SYSTEM, filed May 16, 1994, assigned to the same assignee, EATON CORPORATION, as is this application.

FIELD OF INVENTION

The present invention relates to a calibration technique for assembled vehicles, preferably heavy-duty vehicles equipped with an electronic data link conforming to the SAE J1922 or J1939 or similar protocol, for determining the intercept and slope variables defining a presumed linear relationship between accessory torque and engine deceleration rate for that particular vehicle assembly and/or for determining a value indicative of rotational moment-of-inertia for the internal combustion engine installed in that particular vehicle assembly.

To determine vehicle gross combined weight (GCW) and/or to adaptively control automated or partially automated vehicular mechanical transmission systems, it is desirable to know the torque at the engine flywheel and/or the engine deceleration rate. Knowing true torque at the flywheel and/or the engine deceleration rate will allow more precise shift control and makes possible advanced algorithms, such as shiftability and GCW determinations. To determine flywheel torque from the information available on a CAN, SAE J1922 or SAE J1939-type data link, it is important that current accessory torque be determinable and that a value indicative of engine rotational moment-of-inertia be know.

In above-mentioned co-pending U.S. Ser. No. 08/242,824, entitled ENGINE ACCESSORY TORQUE AND ENGINE DECELERATION RATE DETERMINATION METHOD/SYSTEM, there is disclosed an adaptive shift control for automated vehicular mechanical transmission systems which, as a function of accessory torque, moment-of-inertia and data link information will continuously update the value of the control parameter indicative of engine flywheel torque, from which value and certain drivetrain characteristics, such as engaged gear ratio, tire size, efficiency, etc., the value of the control parameter indicative of drivewheel torque may be accurately determined and/or will continuously update the value of the control parameter indicative of deceleration rate of the engine.

DESCRIPTION OF THE PRIOR ART

Partially automated vehicular transmission systems utilizing an automatic or semi-automatic shift implementation system/method for a mechanical transmission system for use in vehicles having a manually only controlled master clutch are known in the prior art. An electronic control unit (ECU) is provided for receiving input signals indicative of transmission input and output shaft speeds and/or engine speed and for processing same in accordance with predetermined logic rules to determine (i) if synchronous conditions exist, and (ii) in the automatic preselection mode, if an upshift or downshift from the currently engaged ratio is required and to issue command output signals to a transmission actuator and/or an engine fuel controller for shifting the transmission in accordance with the command output signals. Transmission systems of this general type may be seen by reference to U.S. Pat. Nos. 5,050,079; 5,053,959; 5,053,961; 5,053,962; 5,063,511; 5,081,588; 5,089,962; 5,089,965 and 5,272,939, the disclosures of which are incorporated herein by reference.

In accordance with the inventions of aforementioned co-pending U.S. Ser. No. 08/179,060 and U.S. Pat. No. 5,272,939, and of U.S. Pat. Nos. 5,133,229; 5,172,609 and 5,231,582, the disclosures of which are incorporated herein by reference, drawbacks of the prior art systems discussed above are minimized or overcome by the provision of shift control methods/systems for vehicular at least partially automated mechanical transmission systems which, upon sensing an automatic or manual selection of an upshift from a currently engaged gear ratio into a target gear ratio will, based upon currently sensed vehicle operating conditions, determine if the selected upshift is feasible (I.e., desirable and/or probably completible) and only initiate feasible shifts. If the proposed upshift is not feasible, the shift request may be modified (i.e., a skip shift request changed to single shift) or cancelled for a predetermined period of time (such as 10 seconds).

The foregoing prior art control logic was not totally satisfactory, as the control parameter value indicative of drivewheel torque required expensive shaft torque sensors to acquire and/or was derived from gross engine torque values which do not account for torque losses due to vehicle assembler-installed accessories (such as air-conditioning, alternator, etc.) and for accelerating the engine. For example, during acceleration in the low gears of a heavy truck, the torque number reported from the engine on an SAE J1939-type datalink is a fairly high number at wide-open throttle. However, most of the torque the engine "says" it is producing is going to accelerate the engine rotating inertia anal/or to drive vehicle accessories and only a portion of that reported torque is going from the flywheel through the clutch to actually move the vehicle.

In accordance with the invention of co-pending application U.S. Ser. No. 08/242/824, entitled ENGINE ACCESSORY TORQUE AND ENGINE DECELERATION RATE DETERMINATION METHOD/SYSTEM, the drawbacks of the prior art are minimized or overcome by the provision of an adaptive control for an at least partially automated vehicular mechanical transmission system which accurately determines a value indicative of engine accessory torque under current vehicle operating conditions and engine flywheel torque as a function of accessory torque and determines a value indicative of the deceleration rate of the engine. The control is particularly useful for vehicular automated mechanical transmission systems communicating with an electronically controlled internal combustion engine by means of a datalink of the type conforming to a protocol similar to SAE J1922 or J1939.

The above is accomplished in a vehicular automated mechanical transmission system control of the type not automatically disengaging the master clutch during shifting operations by utilizing the relationship that:

$$T_{EG} = T_{FW} + T_{BEF} + T_{ACCES} + T_{ACCEL}$$

where:

$T_{EG}$=gross engine torque;

$T_{FW}$=flywheel Torque;

$T_{BEF}$=base engine friction torque (includes the torque to overcome engine internal friction and the torque to rotate the engine manufacturer-installed accessories (i.e., water pump, oil pump, etc.));

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment-of-inertia (I) of engine.

Instantaneous values representative of gross engine torque ($T_{EG}$) and base engine friction torque ($T_{BEF}$) are available on the datalink. $T_{ACCEL}$ is determined from sensed engine acceleration (which may be negative) and a calibrated rotational moment-of-inertia (I) of the engine. Accessory torque ($T_{ACCES}$) is a constantly determined value which, Applicant has determined, may be taken as net engine torque (i.e., $T_{EF}$–$T_{BEF}$) if the vehicle is idling with the transmission in neutral and/or the master clutch disengaged and is related to engine deceleration rate in a known, substantially linear manner when the vehicle is at rest or in motion.

With the vehicle idling at rest, accessory torque ($T_{ACCES}$) is determined as a function of gross minus base friction torque ($T_{EF}$–$T_{BEF}$) and engine deceleration rate (dES/dt rate) is derived from a determined, known linear relationship between engine deceleration rate and accessory torque. With the vehicle in motion, engine deceleration rate is sensed, preferably during upshift synchronizing operations, and accessory torque is derived from the known linear relationship between engine deceleration rate and accessory torque. Engine deceleration rate (dES/dt rate) is the natural deceleration or decay rate of engine speed when fuel is set to a minimum value.

Accordingly, an adaptive control system/method for a vehicular at least partially automated mechanical transmission system is provided which continuously updates the value of a control parameter ($T_{ACCES}$) indicative of accessory torque and the value of a control parameter (dES/dt rate) indicative of the deceleration rate of the engine. These control parameters are used to control operation of the automated mechanical transmission system.

To allow the above-discussed adaptive control to be useful for a variety of different types of vehicle assemblies, including vehicles with differing chassis configurations, differing accessories, differing engine types and the like, it is desirable to provide an "end-of-line" calibration technique wherein the slope and intercept variables defining the presumed linear relationship between engine accessory torque ($T_{ACCES}$) and engine deceleration (i.e., decay) rate (dES/dt rate) and the value of engine rotational moment-of-inertia (I) are individually determined for each vehicle.

SUMMARY OF THE INVENTION

In accordance with the present invention, the requirements of the prior art are met by the provision of an "end-of-line" calibration technique for a vehicular control system in a vehicle equipped with a data link at least substantially conforming to SAE J1922 or J1939-type protocols by which slope and intercept variables defining a presumed linear relationship between engine accessory torque ($T_{ACCES}$) and natural engine deceleration rate (dES/dt) and/or a value indicative of engine rotational moment-of-inertia (I) may be determined.

To accomplish calibration of the engine accessory torque/engine deceleration rate linear relationship, two points on the line, as far apart as possible, need to be known. As a practical matter, the two points selected are the points representing minimum and maximum accessory loading. A simple calibration computer connected to the transmission controller monitors engine reported torque (gross torque minus engine friction torque, both of which are reported by the engine ECU on SAE J1939/J1922 communication link) and engine speed (for deceleration calculations). The vehicle engine is brought to normal operating temperature. All vehicle accessories are turned off. With the vehicle parked, the transmission in neutral, the master clutch engaged and the engine idling, the engine torque is recorded. Then, the engine is run up in speed to governed speed and the throttle is released. The engine deceleration rate, through some operating speed (i.e., 1,600 RPM), is recorded. This is the minimum accessory torque "point." Next, all of the engine external and vehicle accessories (i.e., lights, air-conditioning, fans, etc.) are turned on and the above test is repeated to obtain the maximum accessory torque point. Then, with these two points, the calibration computer can easily determine the linear relationship and determine the calibration constants.

To accomplish determination of the engine rotating inertia (I), a second end-of-line test is run. This inertia number will include the master clutch, engine flywheel, the input of the transmission and the rotating inertia of all of the installed accessories.

First, the gross engine torque at a constant speed of 1,800 RPM (or rated speed), with the transmission in neutral, is determined. With the vehicle stopped, in neutral and clutch engaged, the engine is run up to (approximately) 1,800 RPM and held at constant speed. The gross engine torque is read from the J1939/J1922 link. This is the motoring torque required to turn the engine and accessories at 1,800 RPM. Then, the engine is allowed to idle. The throttle is then fully depressed and the engine speed (equals input speed) and gross torque are monitored as the engine passes through 1,800 RPM. The engine acceleration rate Is determined at around 1,800 RPM. The net torque to achieve that acceleration is the gross torque during full throttle acceleration (in neutral) minus the motoring torque recorded above. To determine "I," solve the classic formula for "T":

$$Torque = I \times dES/dt$$

The units of torque are pound-feet. The units of "I" are pound-feet-second². The units of dES/dt are rad/second².

The calibration determined constants are then communicated to and stored by a controller such as the transmission controller, and the transmission system thereafter will be controlled as a function of these values.

Accordingly, it is an object of the present invention to provide an end-of-line-type calibration technique for an adaptive automated transmission control system for determining the slope and intercept values defining a presumed linear relationship between engine accessory torque ($T_{ACCES}$) and engine deceleration rate (dES/dt rate) and for determining engine rotating inertia (I).

This and other objects and advantages of the present invention will become apparent from a reading of the detailed description of the preferred embodiment taken in connection with attached drawings.

DESCRIPTION OF THE PREFERRED EMBODIMENT

Figure 1:
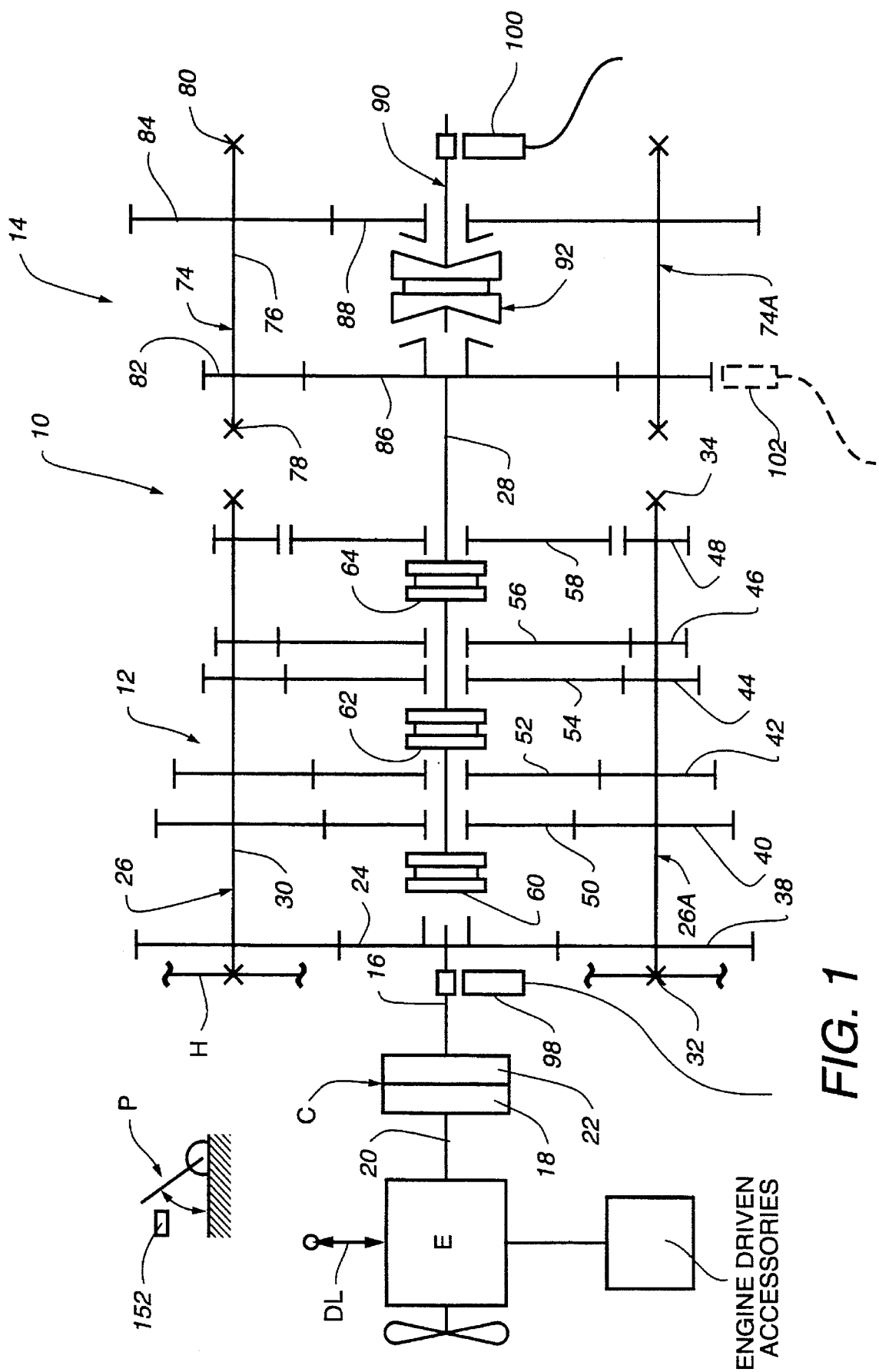
FIG. 1 is a schematic illustration of a partially automated vehicular mechanical transmission system of the type advantageously utilizing the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Referring to FIG. 1, a range-type compound transmission 10 of the type at least partially automated by a semi-automatic mechanical transmission system having an automatic preselect mode of operation is illustrated. Compound transmission 10 comprises a multiple speed main transmission section 12 connected in series with a range-type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in CAN, SAE J1922 or SAE J1939 protocol, and the master clutch C is manually controlled by a clutch pedal (not shown) or the like. Typically, the clutch C is utilized only for start-from-stop and for inching operation of the vehicle. Engine E typically drives a plurality of vehicle assembler-installed accessories, such as lights, air-conditioning and the like, through engine-driven belts or the like.

Transmissions similar to mechanical transmission 10 are well known in the prior art and may be appreciated by reference to U.S. Pats. No. 3,105,395; 3,283,613 and 4,754,665, the disclosures of which are incorporated by reference. Partially automated vehicular mechanical transmission systems of the type illustrated may be seen by reference to above-mentioned U.S. Pat. Nos. 5,050,079; 5,053,959; 5,053,961; 5,053,962; 5,063,511; 5,089,965 and 5,272,939.

Although the control method/system of the present invention is particularly useful for those automated mechanical transmission systems not having automatic clutch actuators or input shaft brakes, the present invention is not limited to such use.

Examples of other types of automated mechanical transmission systems advantageously utilizing the present invention may be seen by reference to U.S. Pat. Nos. 3,961,546; 4,361,060; 4,425,620; 4,631,679 and 4,648,290, the disclosures of which are incorporated herein by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range, Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
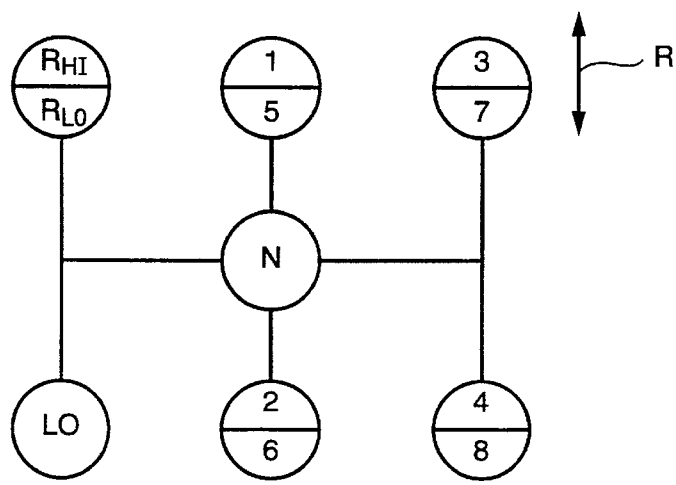
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high-range operation or gear 88 to output shaft 90 for low-range operation of the compound transmission 10. The "shift pattern" for compound range-type transmission 10 is schematically illustrated in FIG. 1A.

Range section actuator 96 may be of the type illustrated in U.S. Pat. Nos. 3,648,546; 4,440,037 and 4,614,126, the disclosures of which are incorporated herein by reference.

Although the range-type auxiliary section 14 is illustrated as a two-speed section utilizing spur or helical type gearing, it is understood that the present invention is also applicable to range-type transmissions utilizing combined splitter/range-type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing the automatic preselect mode of operation and the automatic or semi-automatic shift implementation operation of transmission 10, an input shaft speed (IS) sensor and an output shaft speed (OS) sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. Further, with main clutch C fully engaged, input shaft speed (IS) will equal engine speed (ES).

Figure 2:
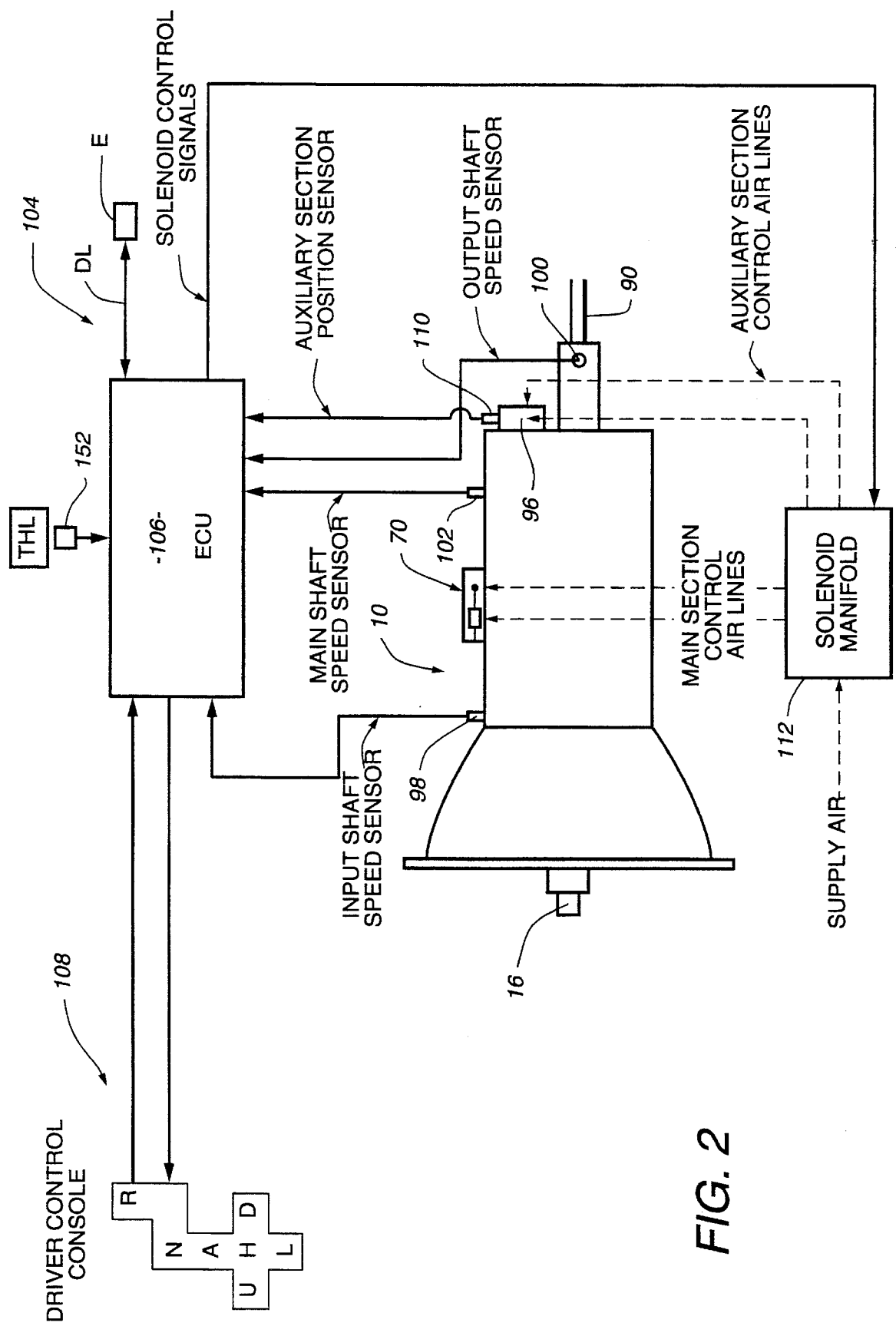
FIG. 2 is a schematic illustration of an automatic preselect and semi-automatic shift implementation system for a mechanical transmission system of the present invention.

The automatic preselect and automatic or semi-automatic shift implementation control system 104 for a mechanical transmission system of the present invention is schematically illustrated in FIG. 2. Control system 104, in addition to the mechanical transmission 10 described above, includes an electronic control unit 106, preferably microprocessor based, for receiving input signals from the input shaft speed sensor 98, from the output shaft speed sensor 100 (or, alternatively, the mainshaft speed sensor 102), from the driver control console 108, from a throttle pedal P position sensor 152, and from the engine E though data link DL. Typically, at least information indicative of engine speed (ES), gross engine torque ($T_{EF}$) and base engine friction torque ($T_{VEF}$) will be available on the datalink. The IECU 106 may also receive inputs from an auxiliary section position sensor I 10.

The ECU 106 may be of the type schematically illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108, and through the data link DL to engine F.

In the preferred embodiment, the driver control console allows the operator to manually select a shift in a given direction (up or down) or to neutral from the currently engaged ratio, or to select a semi-automatic preselect mode of operation (D), and preferably provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 may be of the "R—N—A—H—L" (Le., reverse-neutral-(automatic)drive-hold-low) type with a manual upshift and downshift selector.

To implement a selected shift, the manifold 112 is preselected to cause actuator 70 to be biased to shift main transmission section 12 into neutral. This is accomplished by the operator or the ECU controller causing a torque reversal by momentarily decreasing and/or increasing the supply of fuel to the engine, see U.S. Pat. No. 4,850,236, the disclosure of which is incorporated herein by reference. As the transmission is shifted into neutral, and neutral is verified by the ECU (neutral sensed for a period of time such as 1.5 seconds), if the selected shift is a compound shift, i.e., a shift of both the main section 12 and of the range section 14, such as a shift from fourth to fifth speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged ($GR_{TARGET}$), which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

Under certain operating conditions of the vehicle, an automatically or manually selected shift may not be completable or will result in unacceptable vehicle performance after completion of an upshift. These conditions usually involve upshifts when the vehicle is heavy loaded and/or is traveling against a great resistance, such as in mud, up a steep grade and/or into a strong headwind.

By way of example, to achieve substantial synchronous conditions to complete an upshift, the speed of the input shaft 10 (which substantially equals the speed of the engine E with the master clutch engaged) must be decreased to substantially equal the speed of the output shaft 90 (directly proportional to vehicle speed) multiplied by the target gear ratio. As an automated clutch actuator and input shaft brake are not provided, the speed of the input shaft will decrease with the rate of decay of engine speed. Thus, to achieve substantially synchronous conditions for engagement of the target ratio, IS should substantially equal $OS*GR_{TARGET}$ and, with the master clutch fully engaged, IS will substantially equal ES.

Figure 5:
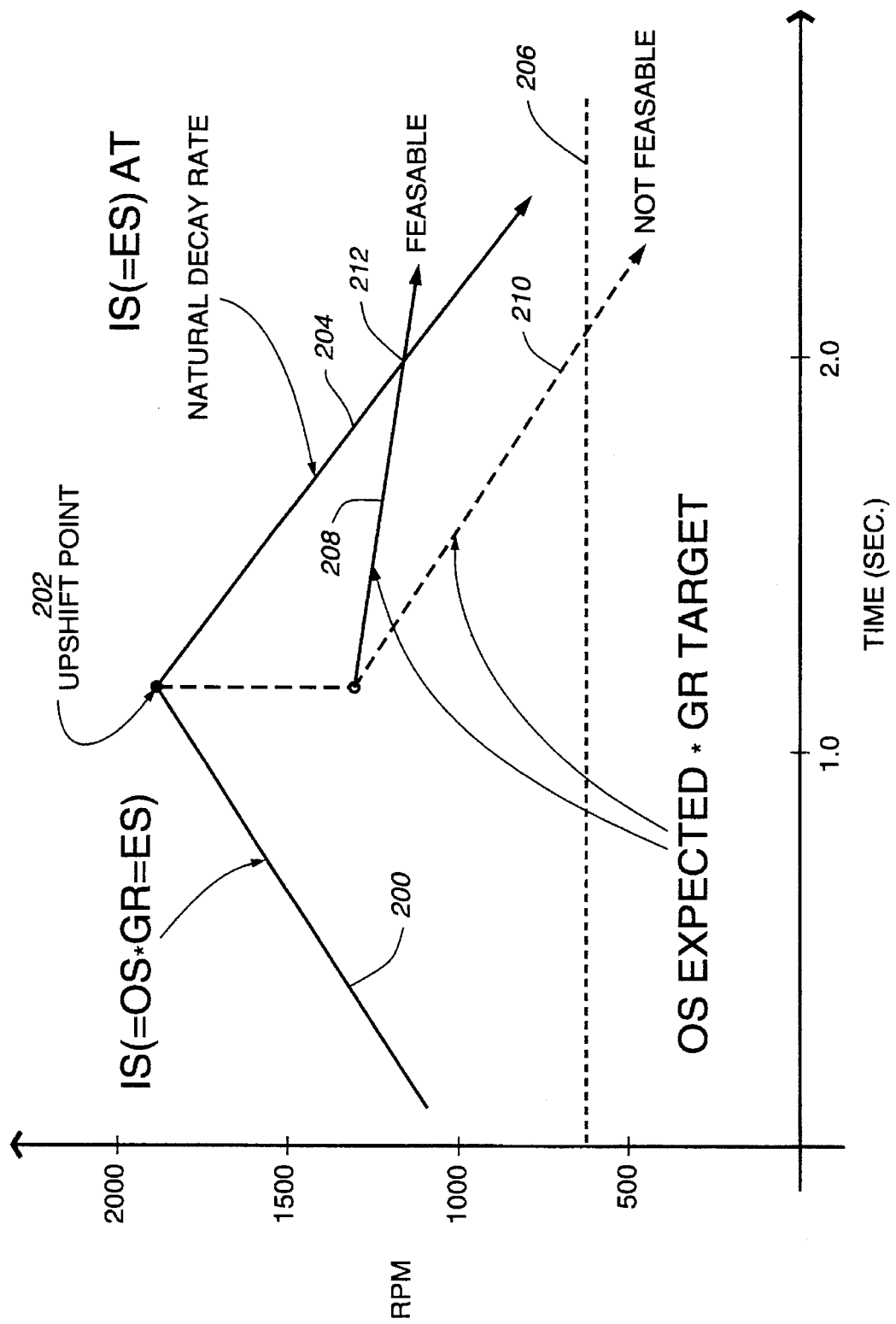
FIG. 5 is a graphical representation of an upshift event illustrating both feasible and not feasible attempted shifts.

The sequence of an upshift of the illustrated automated mechanical transmission system is graphically illustrated in FIG. 5. Line 200 represents the input shaft speed (IS) at vehicle conditions prior to the upshift point 202 wherein the current gear ratio (GR) is fully engaged, the master clutch C is fully engaged, and ES=IS=OS*GR. Upon a shift into neutral, as the engine is defueled (i.e., fueling of the engine is reduced to a minimum value), the input shaft speed and engine speed will decay at the constant (but not necessarily linear) rate (dIS/dt) represented by line 204 until idle speed 206 is reached. The expected speed of the output shaft 90 during the shift transient when zero engine torque is applied to the vehicle drive wheels ($OS_{EXPECTED}$) multiplied by the target gear ratio, which product is the required synchronous speed of the input shaft/engine, is represented by lines 208 and 210 illustrating, respectively, that product at a lesser or greater resistance to motion of the vehicle. As may be seen under conditions of lower resistance (line 208), synchronous will occur at point 212 and the selected upshift is feasible while, under conditions of greater resistance (line 210), substantial synchronous will not occur and the selected upshift is not feasible.

In a typical diesel engine of a heavy duty truck, the engine/input shaft decay rate (dES/dr rate) is about 300 to 800 RPM and both the engine and vehicle deceleration may be approximated as linear. The specific rate of decay of the engine and/or input shaft may be learned by differentiating the value of ES and/or IS signals during a defueling condition (see, for example, aforementioned U.S. Pat. No. 4,361,060). The decay rate may vary considerably, however, with temperature and use of engine-driven accessories.

As may be seen by reference to FIG. 5, if the input shaft speed (IS) (as determined by initial input shaft speed at point 202 and the acceleration of the input shaft (dIS/dt)) will be substantially equal to the product of expected output shaft speed at zero torque to the vehicle drive wheels ($OS_{EXPECTED}$), which is determined by initial OS (–IS/GR) and the vehicle acceleration (dOS/dr) at current resistance to vehicle motion, multiplied by the numerical value of the target gear ratio ($GR_{TARGET}$) at a value greater than a reference (such as engine idle speed 206), then achieving a synchronous shift into the selected target gear ratio is feasible; if not, achieving a substantially synchronous shift into the selected target gear ratio is infeasible. The OS and dOS/dt signals are, of course, equivalent to vehicle speed and vehicle acceleration signals, respectively. The reference value is illustrated as engine idle speed 206 but can be a lower positive value if the master clutch is manually or automatically disengaged.

For purposes of feasibility determination, for vehicles having a widely variable gross combined weight ("GCW"), i.e., combined weight of vehicle, fuel, cargo (if any) passengers (if any) and operator, the controller will determine current GCW. From this information, the system can determine what the vehicle acceleration (usually a deceleration) will be at zero driveline torque, i.e., the slope of line 208 or 210. Based upon this information and a present or learned value of engine decay rate, i.e., the slope of line 204, which may vary with engine speed, operating temperature, operation of an engine brake, etc., the ECU can then determine if, under current vehicle operating conditions, the system is able to successfully complete the proposed upshift. Based upon this information, the control system can then either (i) issue command signals to implement the proposed upshift, or (ii) modify the proposed shift (usually command a single rather than a skip upshift, or (iii) cancel/prohibit the shift request for a predetermined period of time (such as, for example, about 10 seconds).

Briefly, the acceleration of the vehicle at zero torque to the drive wheels can be approximated by the relationship:

$$A_{o\ TORQUE} = A_i - (T_i/CW)$$

where:
- $A_i$=vehicle acceleration at engine torque i to the drive wheels,
- C=a constant,
- $T_i$=engine torque i to the drive wheels, and
- W=gross combined vehicle weight.

Figure 3A:
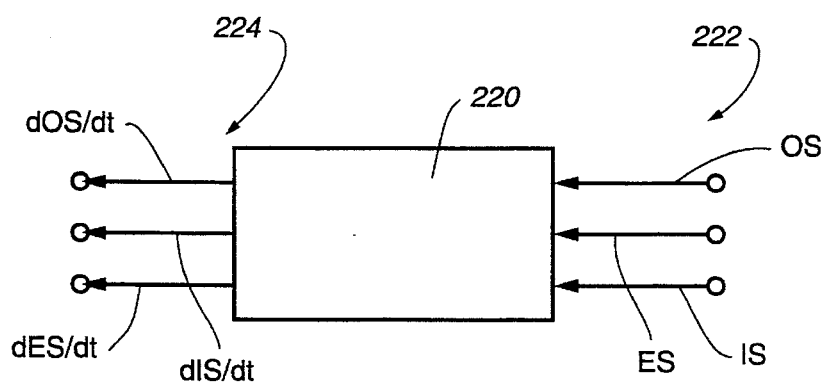
FIG. 3A is a schematic illustration of logic for differentiating signals representative of current vehicle and engine speed.

FIG. 3A schematically illustrates a logic element or subroutine 220 for differentiating various input signals 222, such as OS and/or ES, to determine the derivatives with respect to time thereof, dQS/dt and/or dES/dt, as output signals 224.

Figure 3B:
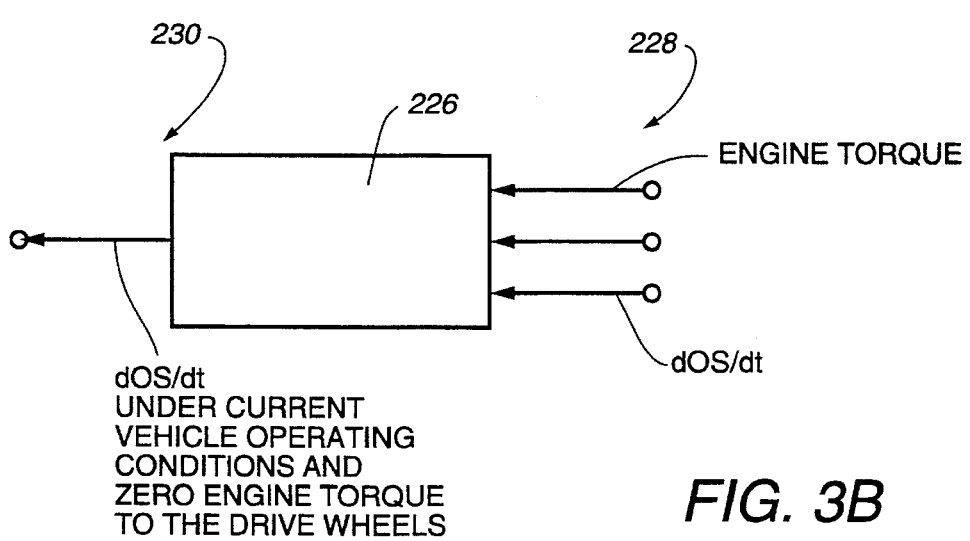
FIG. 3B is a schematic illustration of logic for calculating an expected vehicle acceleration during the shift transient when zero engine torque is applied to the drive wheels.

FIG. 3B schematically illustrates a logic element or subroutine 226 wherein input signals 228, including signals indicative of engine torque and vehicle acceleration (dOS/dt), are processed according to the logic rules set forth above to determine an output signal value 230 indicative of expected vehicle acceleration (dQS/dt) during the shift transient when no engine torque is applied to the vehicle drive wheels.

The foregoing is illustrative of a control system which automatically evaluates the feasibility, under current vehicle operating conditions, of manually or automatically preselected shifts and either causes such proposed shifts to be executed, modified or cancelled. In the event of a manually selected upshift determined to be unfeasible, the operator may be issued a tactile, audible or visual warning.

As illustrated above, in fully automated or partially automated mechanical transmission systems, it is desirable to know the torque at the flywheel (TFw) and/or the engine deceleration rate (dES/dt rate) for many control algorithms. Knowing true torque at the flywheel and/or the engine deceleration rate (dES/dt rate) will allow more precise shift control and makes possible advanced algorithms, such as shiftability and GCW calculations. Flywheel torque is a function of accessory torque. The control of this invention uses torque information from the engine (preferably an electronic engine) along with vehicle and engine acceleration information to calculate these control parameters.

In addition to transmission control, accurate determination of vehicle GCW is useful in the control of other vehicle systems such as antilock brake, active suspension, central tire inflation and/or fleet management systems.

For controlling a fully or partially automated vehicular mechanical transmission system, it is important to be able to determine an accurate value indicative of drivewheel torque. Drivewheel torque may be determined as a function of engine flywheel torque (i.e., input torque to the vehicle master clutch or torque converter) if drivetrain parameters, such as current transmission gear ratio, drive axle ratio, drivetrain efficiency and tire size, are known.

For heavy-duty vehicles with electronically controlled engines communicating on datalinks of the type defined in SAE J1922 and J1939 protocols, engine torque may be represented by the relationship:

$$T_{EF} = T_{FW} + T_{BEF} + T_{ACCES} + T_{ACCEL}$$

where:

$T_{EF}$=gross engine torque;

$T_{FW}$=flywheel torque;

$T_{BEF}$=base engine friction torque;

$T_{ACCES}$=accessory torque; and $T_{ACCEL}$=torque to accelerate the engine.

Gross engine torque ($T_{EG}$) and base engine friction torque ($T_{BEF}$), the torque necessary to drive engine manufacturer-supplied devices (such as oil pumps) and to overcome internal engine friction, are parameters available on the electronic databus (DL). Torque to accelerate the engine ($T_{ACCEL}$) is determined as a function of sensed engine acceleration and known or determined engine moment-of-inertia ($T_{ACCEL}=dES/dt*I_{ENGINE}$). It is noted that $T_{ACCEL}$ may have a positive or negative value.

Accordingly, to determine flywheel torque ($T_{FW}$), which is a control parameter in shiftability logic, GCW determination logic and the like, in addition to determining engine moment-of-inertia ($I_{ENGINE}$), it is necessary to provide a control technique for determining accessory torque ($T_{ACCES}$). The value of accessory torque ($T_{ACCES}$) may vary substantially and often, as vehicular accessories such as lights, air-conditioning, fan drives and the like are turned off and on automatically or by the vehicle operator and/or passengers.

Assuming unaided engine deceleration (no engine brake operation), it has been observed that engine accessory torque ($T_{ACCES}$) and engine deceleration rate (dES/dr rate) vary dependently, and substantially linearly, upon each other. Engine deceleration rate (dES/dt rate) is the rate of engine deceleration when the transmission is in neutral and/or the master clutch is fully disengaged, and fueling is set at a minimal value. As accessory load increases, the engine deceleration rate increases in proportion to it.

For controlling the automated mechanical transmission system, it also may be necessary to determine the engine deceleration rate (dES/tit) at a time when the vehicle is not in motion and/or has not been shifting.

Figure 6:
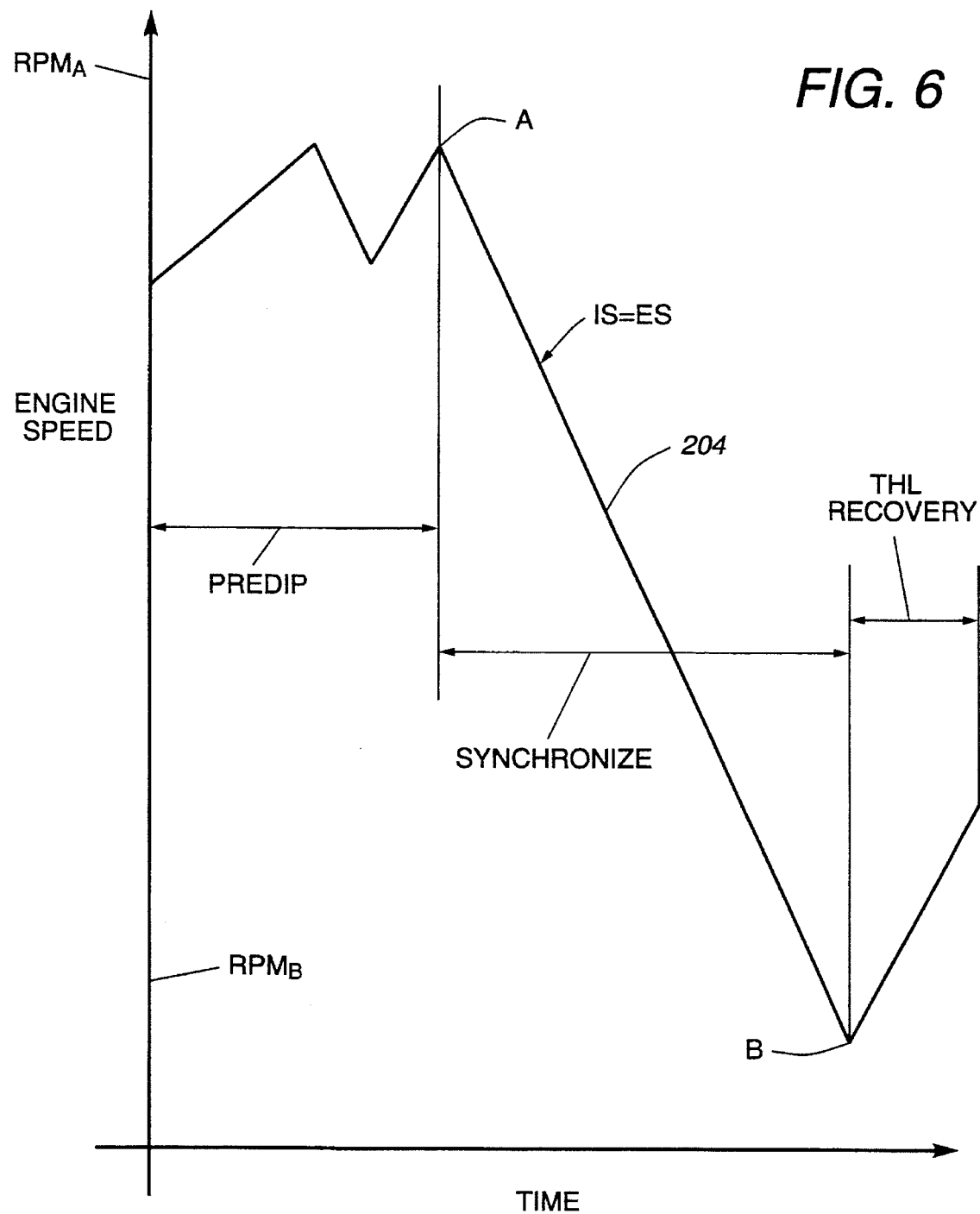
FIG. 6 is a graphical representation, similar to FIG. 5, of engine speed and input shaft speed during an upshift.

Engine deceleration when the vehicle is in motion and upshifting is determined as follows. For automated transmission systems of the type having an engine controlled by the ECU over an electronic datalink of the Type defined in the SAE J1922 or J1939 protocol, the engine is operated in a "predip" mode prior to disengagement of the existing ratio, in a "synchronizing" mode after a shift from the existing ratio into neutral, and in the "throttle recovery" mode immediately after engagement of the target gear ratio. The engine and input shaft speeds in these modes are illustrated in FIG. 6. In the "predip" mode, fueling is modulated to cause driveline torque reversals to relieve torque lock conditions. In the "synchronizing" mode, engine fueling is minimized, allowing engine and input shaft speeds to decay down to a synchronous speed for engaging the target gear ratio ($ES=IS=OS*GR_{TARGET}$). engine is smoothly returned to that value indicated by the operator's positioning of the throttle pedal.

To accurately determine the current engine deceleration rate value while in the synchronous mode of engine operation, and to minimize the effects of noise, torsionals and the like, it is important that for each measurement, the greatest possible differential between initial and final engine speed be utilized, and that a filtering technique be utilized. Accordingly, to determine a value indicative of current engine deceleration, readings must be taken during the synchronous engine control phase of an upshift, and should include a first reading at or near point A in FIG. 6 when the synchronous engine control phase is first initiated, and a second reading at or near point B in FIG. 6 when the synchronous engine control phase is ended or is about to end. The current value for engine deceleration ($dES_{CURRENT}$) will then be ($RPM_A - RPM_B$)÷($Time_A - Time_B$). This value is then filtered to provide an updated control parameter, for example:

$$d_{ESUPDATED} = [(dES_{CURRENT}) + ((7)*(dES_{PREVIOUS}))] \div 8$$

The occurrence of point A is taken as the first time operation in the synchronous mode is sensed. The occurrence of point B is taken as the first time operation in the throttle recovery mode is sensed. As no measurable change in engine speed is expected in the cycle times between entering the upshift engine control subroutine (i.e., about 40 milliseconds), this is a very accurate method of obtaining the maximum magnitude of change in engine speed during the synchronous operation of each upshift.

Experience with heavy-duty vehicles has shown that a 4:1 to 20:1 filtering technique, preferably about a 7:1 filtering technique, provides suitable responsiveness while filtering out the drivetrain noises due to vibrations, torsionals and the like.

The present invention provides a control method/system for controlling an at least partially automated vehicular mechanical transmission system wherein accessory torque and engine deceleration rate may be determined with the vehicle in motion or at rest.

When the vehicle is stopped with the engine idling and the transmission in neutral or the master clutch disengaged, accessory torque ($T_{ACCES}$) is substantially equal to gross engine torque minus base engine friction torque ($T_{EG}-T_{BEF}$). $T_{EG}-T_{BEF}$ is also referred to as "net engine torque." This value is preferably sensed from the databus or datalink (DL) and preferably subject to a filtering averaging process.

Figure 7:
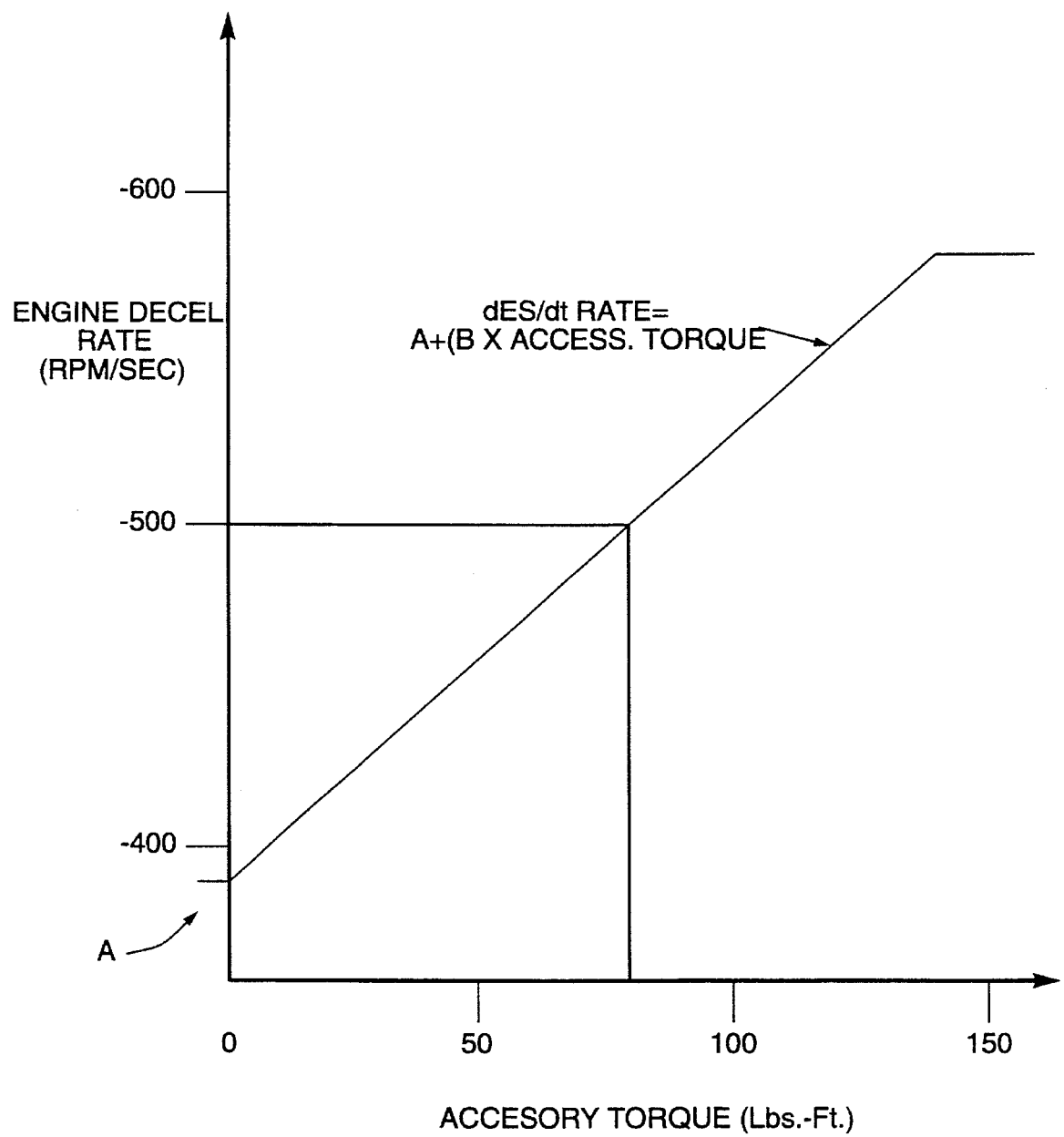
FIG. 7 is a graphical representation of the substantially linear relationship between accessory torque ($T_{ACCES}$) and engine deceleration rate (dES/dr rate).

The system controller is provided with information which relates engine deceleration rate (dES/dt rate) to accessory torque ($T_{ACCES}$) in a predetermined, substantially linear manner wherein engine deceleration rate equals A+(B * accessory torque) where "A" and "B" are predetermined, stored parameters. If dES/dt rate is in units of RPM/second and $T_{ACCES}$ is in units of pound-feet, then "A" is the "intercept" value and will be in units of RPM/second, and "B" is the "slope" value and will be in units of RPM/second/pound-feet. FIG. 7 is a graphical representation of this relationship.

Using the foregoing relationship and the value of accessory Torque, an expected engine deceleration rate may be determined while the vehicle is at rest. The rate thus determined or derived is an approximation for the system logic to utilize for vehicle start-up and is corrected and updated using filtered, actually sensed engine deceleration values as soon as the vehicle gets moving and making upshifts.

When the vehicle is moving and has performed upshifts, engine deceleration rate (dES/dt rate) may be determined by observing actual engine deceleration when the transmission is in neutral and engine fueling is reduced to a minimal value and, preferably, calculating a filtered average of the observed values. See, for example, aforementioned copending U.S. patent application Ser. No. 08/225,271, entitled ENGINE DECELERATION DETERMINATION METHOD/SYSTEM. Accessory torque ($T_{ACCES}$) is then determined from the same predetermined linear relationship discussed above, i.e., $T_{ACCES}$=(engine deceleration rate−A)÷B. Using the example of FIG. 7, engine deceleration rate equals $-385+(-2*T_{ACCEL})$ and, at an observed, averaged engine deceleration rate (dES/dt rate) of −500 RPM/second, accessory torque ($T_{ACCES}$) would equal about 81.25 pound feet.

To allow the foregoing adaptive controls to be utilized with a wide range of engine/vehicle accessory combinations, each of which may have a different linear relationship and/or engine rotational moment-of-inertia, the present invention provides a system/method, preferably for use at the end of a vehicle final assembly line, for a calibration determination of (1) the intercept value ("A") and the slope value ("B") of the linear equation (dES/dt rate=A÷B * $T_{ACCES}$)) defining the presumed linear relationship between engine deceleration rate and accessory torque and/or (2) a value indicative of engine rotational moment-of-inertia for individual assembled vehicles. These values, once determined, are stored in one or more of the system ECUs, and one or more of the vehicle systems are controlled as functions thereof.

To determine the intercept value A and the slope value B defining the engine deceleration rate/engine accessory torque linear relationship, dES/dt rate=A+(B * $T_{ACCES}$), two points on the line, preferably as far apart as possible, must be known. To accomplish this, points at each extreme of engine-driven accessory loading, maximum and minimum, are determined.

For example, to determine this substantially linear relationship during the end of the vehicle assembly line checkout and testing procedure, the following procedure may be followed:

(1) Connect a calibration processor or computer to the SAE J1922/J1939 communication data link to read engine speed (ES), gross engine torque ($T_{EF}$) and base engine friction torque ($T_{BEF}$). The engine speed signal, of course, can be differentiated to provide an engine acceleration signal (dES/dr).

(2) Warm up vehicle engine to nominal operating temperature;

(3) Turn off all accessories (lights, air-conditioning, etc.) with vehicle stopped in neutral and master clutch engaged, then accelerate engine to governed speed by depressing accelerator pedal, and then release pedal and monitor and record engine deceleration rate through a maximum operating speed (i.e., about 1,600–1,800 RPM), then let engine idle and observe accessory torque by monitoring engine datalink ($T_{ACCES}=T_{EF}-T_{BEF}$), this is one point on the line in FIG. 7;

(4) Turn on all accessories to maximum with vehicle stopped in neutral and master clutch engaged, then accelerate engine to governed speed by depressing accelerator pedal, and then release pedal and monitor and record engine deceleration rate, then let engine idle and observe accessory torque by monitoring the datalink, this is a second point on the line in FIG. 7; and (5) Using the two points thus determined, determine the linear equation and enter the corresponding calibrations into the transmission system controller.

To determine the value of engine moment-of-rotational-inertia ($I_E$), the following end-of-line procedure may be followed. The value of rotational inertia determined will include the rotational inertia of the master clutch, engine flywheel, the input of the transmission and the rotating inertia of all of the installed accessories.

(1) The gross engine torque at 1,800 RPM (or rated speed) is determined. With the vehicle stopped, in neutral and clutch engaged. The engine is run up to (approximately) 1,800 RPM and held at constant speed. The gross engine torque is read from the J1939/J1922 link. This is the motoring torque required to turn the engine and accessories at 1,800 RPM.

(2) Then, the engine is allowed to idle. The throttle is then fully depressed and the engine speed (equals input speed) and gross torque are monitored as the engine passes through 1,800 RPM. The engine acceleration rate is determined at around 1,800 RPM. The net torque to achieve that acceleration is the gross torque during full throttle acceleration (in neutral) minus the motoring torque recorded above.

(3) Then, to determine "I", solve the classic formula for "I": Torque=I×dES/dt. The units of torque are pound-feet. The units of "I" are pound-feet-second$^2$. The units of dES/dt are rad/second$^2$.

It is noted that the foregoing procedures may be performed manually or as a routine in an end-of-line calibration computer logic. Alternatively, a similar set of procedures may be incorporated into the transmission controller logic.

Figure 4A:
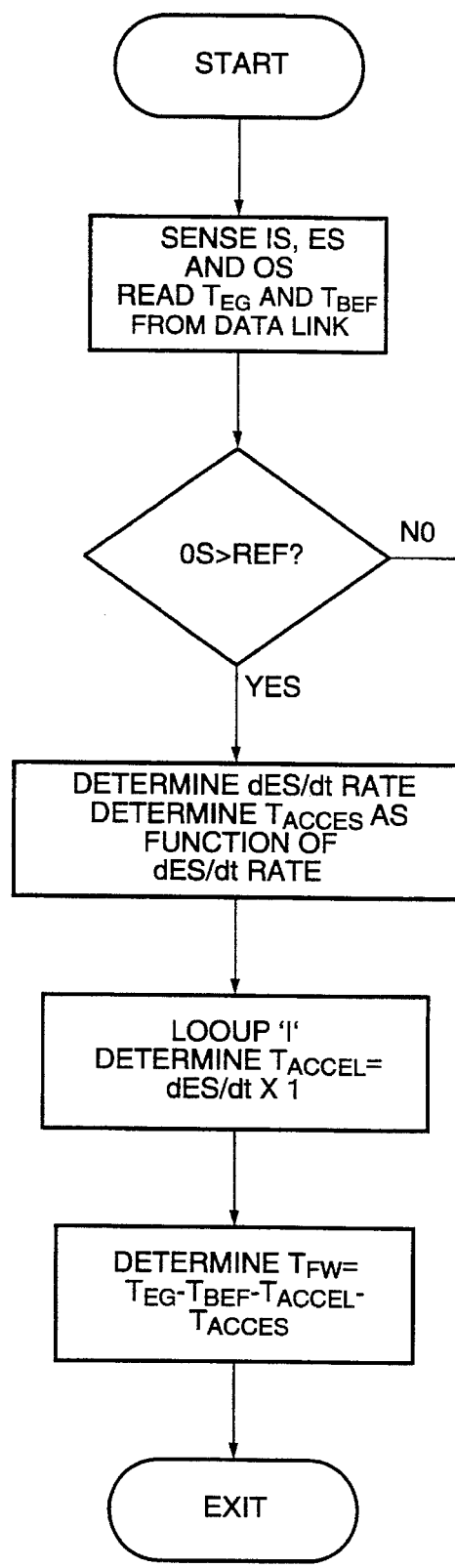
FIGS. 4A and 4B are schematic illustrations, in flow chart format, of an adaptive control method utilizing the constants determined in the calibration techniques of the present invention.
Figure 4B:
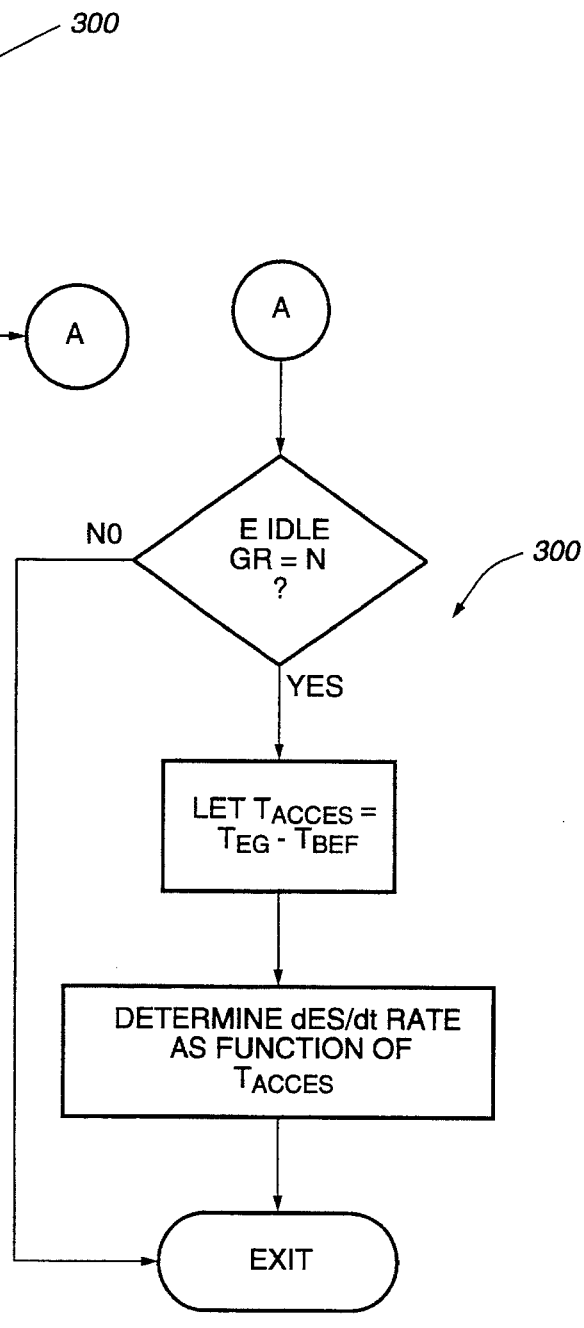

Utilizing the foregoing techniques, an accurate value of $T_{FW}=T_{EG}-T_{BEF}-T_{ACCES}-T_{ACCEL}$ and of engine deceleration rate (dES/dt rate) may be determined for various engine/vehicle accessory combinations. The accessory torque ($T_{ACCES}$), flywheel torque ($T_{FW}$) and engine deceleration rate (dES/dt rate) determination method/system of the present invention is schematically illustrated, in flow chart format, in FIGS. 4A and 4B.

A relatively simple end-of-assembly technique as provided to determine the intercept and slope values defining the engine deceleration rate/accessory torque linear relationship and/or to determine engine rotational moment-of-inertia. Based upon these determined values, a relatively simple and inexpensive adaptive shift implementation control system/method for automated mechanical transmission system 10 is provided, which utilizes existing input signals and the determined linear relationship between unaided engine deceleration rate (dES/dt rate) and accessory torque ($T_{ACCES}$) and/or the determined moment-of-inertia of the vehicle engine to provide accurate values indicative of the accessory torque ($T_{ACCES}$), flywheel torque ($T_{FW}$) and/or engine deceleration rate (dES/dt rate) control parameters.

Although the present invention has been described with a certain degree of particularity, it is understood that various changes to form and detail may be made without departing from the spirit and the scope of the invention as hereinafter claimed.

I claim:

1. A method for controlling an automated mechanical transmission system in an assembled vehicle having a multiple-speed mechanical transmission, an internal combustion engine, a non-positive coupling drivingly interposed the transmission and the engine, an electronic data link carrying signals indicative of engine torque and engine speed, and a controller for receiving input signals and processing same according to predetermined logic rules to issue command output signals to a transmission actuator, said method comprising:

(a) determining in a calibration operation values allowing post-calibration determination of engine deceleration rate (dES/dt rate) and engine accessory torque ($T_{ACCES}$) by the process of:
      (i) presuming a linear relationship between engine deceleration rate and engine accessory torque (dES/dt rate=A+(B * $T_{ACCES}$)) in an assembled vehicle;
      (ii) experimentally determining a first set of values defining engine deceleration rate (dES/dt rate$_1$) and engine accessory torque ($T_{ACCES1}$) when engine accessory torque is at a minimum value;
      (iii) experimentally determining a second set of values defining engine deceleration rate (dES/dt rate$_2$) and engine accessory torque ($T_{ACCES2}$) when engine accessory torque is at a maximum value;
      (iv) taking said first and second sets of values as points on a line and mathematically defining a linear equation including said points (dES/dt=(A+B * $T_{ACCES}$)); and
      (v) memorizing the intercept (A) and slope (B) values of said linear equation;
   (b) during post-calibration vehicle operation, determining engine deceleration rate as a function of input signals indicative of engine accessory torque and said linear relationship when the vehicle is not in motion and the engine is at idle, and determining engine accessory torque as a function of input signals indicative of engine deceleration rate and said linear relationship when the vehicle is in motion; and
   (c) causing said controller to control said transmission as a function of at least one of engine deceleration rate and engine accessory torque.

2. The method of claim 1 wherein said data link (DL) carries information indicative of gross engine torque ($T_{EF}$), base engine friction torque ($T_{BEF}$) and engine rotational speed (ES), said experimentally determining a first set of values comprises, with the vehicle stationary and in a transmission neutral condition:
   (i) warming the engine to nominal operating temperature;
   (ii) turning off all engine-driven accessories and taking minimal engine accessory torque as the difference between gross engine torque and base engine friction torque ($T_{ACCES1}=T_{EG}-T_{BEF}$);
   (iii) accelerating the engine to a maximum operating speed;
   (iv) then decreasing fueling of the engine, allowing the engine to decelerate, monitoring engine deceleration (dES/dt) through a preselected operating speed; and
   (v) taking said value as the engine deceleration rate (dES/dt rate$_1$) at engine accessory torque minimum value; and said experimentally determining a second set of values comprises, with the vehicle stationary and in a transmission neutral condition:
   (i) warming the engine to nominal operating temperature;
   (ii) turning on all engine-driven accessories and taking minimal engine accessory torque as the difference between gross engine torque and base engine friction torque ($T_{ACCES2}=T_{EF}-T_{BEF}$);
   (iii) accelerating the engine to a maximum operating speed;
   (iv) then decreasing fueling of the engine, allowing the engine to decelerate, monitoring engine deceleration (dES/dt) through a preselected operating speed; and
   (v) taking said value as the engine deceleration rate (dES/dt rate$_2$) at engine accessory torque maximum value.

3. The method of claim 5 additionally comprising:
   (d) determining during said calibration operation a value (I) indicative of engine rotational moment-of-inertia by the process of:
      (i) determining gross engine torque at a rated maximum engine operating speed;
      (ii) with the vehicle stationary, the transmission in neutral and the positive coupling engaged, running the engine continuously at the operating speed and monitoring and storing a first gross engine torque;
      (iii) then, after allowing the engine to idle, causing the engine to accelerate through the operating speed and monitoring and storing a second gross engine torque and an engine acceleration value (dES/dt) as the engine passes through the operating speed;
      (iv) then determining a value for engine rotational moment-of-inertia as a function of the difference of second gross engine torque value minus first gross engine torque value, divided by engine acceleration value:

$$\left( \frac{(T_{EG2} - T_{EG1})}{dES/dt} \right)$$

(e) memorizing said value indicative of engine rotational moment-of-inertia; and
   (f) causing the controller to control said transmission as a function of said value indicative of engine rotational moment-of-inertia.

4. A method for controlling an automated mechanical transmission system in an assembled vehicle having a multiple-speed mechanical transmission, an internal combustion engine, a non-positive coupling drivingly interposed the transmission and the engine, an electronic data link carrying signals indicative of engine torque and engine speed, and a controller for receiving input signals and processing same according to predetermined logic rules to issue command output signals to a transmission actuator, said method comprising:

(a) determining in a calibration operation a value (I) indicative of engine rotational moment-of-inertia by the process of:
  (i) determining gross engine torque at a rated maximum engine operating speed;
  (ii) with the vehicle stationary, the transmission in neutral and the positive coupling engaged, running the engine continuously at the operating speed and monitoring and storing a first gross engine torque;
  (iii) then, after allowing the engine to idle, causing the engine to accelerate through the operating speed and monitoring and storing a second gross engine torque and an engine acceleration value (dES/dt) as the engine passes through the operating speed;
  (iv) then determining a value for engine rotational moment-of-inertia as a function of the difference of second gross engine torque value minus first gross engine torque value, divided by engine acceleration value:

$$\left( \frac{(T_{EG2} - T_{EG1})}{dES/dt} \right)$$

(b) memorizing said value indicative of engine rotational moment-of-inertia; and
(c) in post-calibration operation, causing the controller to control said transmission as a function of said value indicative of engine rotational moment-of-inertia.

5. A system for controlling an automated mechanical transmission system in an assembled vehicle having a multiple-speed mechanical transmission, an internal combustion engine, a non-positive coupling drivingly interposed the transmission and the engine, an electronic data link carrying signals indicative of engine torque and engine speed, and a controller for receiving input signals and processing same according to predetermined logic rules to issue command output signals to a transmission actuator, said system comprising:

(a) means for determining in a calibration operation values allowing post-calibration determination of engine deceleration rate (dES/dt rate) and engine accessory torque ($T_{ACCES}$) on the basis of a presumed linear relationship between engine deceleration rate and engine accessory torque (dES/dt rate=A+(B * $T_{ACCES}$)) in an assembled vehicle, said means effective to:
  experimentally determine a first set of values defining engine deceleration rate (dES/dt $rate_1$) and engine accessory torque ($T_{ACCES1}$) when engine accessory torque is at a minimum value;
  experimentally determine a second set of values defining engine deceleration rate (dES/dt $rate_2$) and engine accessory torque ($T_{ACCES2}$) when engine accessory torque is at a maximum value;
  take said first and second sets of values as points on a line and mathematically defining a linear equation including said points (dES/dt=(A+B * $T_{ACCES}$)); and
  cause memorizing of the intercept (A) and slope (B) values of said linear equation;
(b) during post-calibration vehicle operation, determining engine deceleration rate as a function of input signals indicative of engine accessory torque and said linear relationship when the vehicle is not in motion and the engine is at idle, and determining engine accessory torque as a function of input signals indicative of engine deceleration rate and said linear relationship when the vehicle is in motion; and
(c) means effective to control said transmission as a function of at least one of engine deceleration rate and engine accessory torque.

* * * * *